United States Patent [19]

Ishibashi et al.

[11] Patent Number: 5,231,630
[45] Date of Patent: Jul. 27, 1993

[54] NETWORK TERMINATION ENABLING RELIEF OF CALL CONGESTION IN AN EXCHANGER

[75] Inventors: Ryoichi Ishibashi, Yokohama; Toshiyuki Yamamoto, Kawasaki, both of Japan

[73] Assignee: Fujitsu Limited, Kawasaki, Japan

[21] Appl. No.: 683,043

[22] Filed: Apr. 10, 1991

[30] Foreign Application Priority Data

Apr. 10, 1990 [JP] Japan .................................. 2-094401

[51] Int. Cl.$^5$ ............................................. H04Q 11/04
[52] U.S. Cl. ..................................... 370/60; 370/94.1
[58] Field of Search ..................... 370/60, 94.1, 110.1, 370/84; 340/825.05

[56] References Cited

U.S. PATENT DOCUMENTS 5,067,127 11/1991 Ochiai ............................... 370/95.1

OTHER PUBLICATIONS

"Synchronous Optical Network (SONET) Transport Systems: Common Generic Criteria, A Module of TSGR, TR-TSY-000440", Technical Reference TR-TSY-000253, Issue 1, Sep. 1989, Bellcore.
"Recommendations Drafted by Working Party XVIII/8 (General B-ISDN Aspects) to be Approved in 1990", Study Group XVIII (Geneva Meeting, May 23-25, 1990), International Telegraph and Telephone Consultative Committee (CCITT), COM XVIII-R 34-E Jun. 1990.

*Primary Examiner*—Curtis Kuntz
*Assistant Examiner*—T. Ghebretinsae
*Attorney, Agent, or Firm*—Staas & Halsey

[57] ABSTRACT

In a network termination connected to an exchanger and a plurality of terminal adaptors, and enabling relief of call congestion in an exchanger, the network termination includes: a reception port for receiving a reduction rate indicated by a congestion information area in a SDH frame input from the exchanger; a SDH frame transmission unit for transferring the SDH frame including a plurality of ATM cells, each ATM cell having a header field and an information field, and the header field having a busy bit field; an unusable cell preparation unit operatively connected to the SDH frame transmission unit for generating the ATM cell train including the unusable cells defined based on the reduction rate from the exchanger; and a transmission port operatively connected to the unusable cell preparation unit for transferring the ATM cell train including the unusable cells to the end terminals.

7 Claims, 9 Drawing Sheets

ATM CELL TRAIN (REDUCTION RATE: 50%)

| BUSY="1" CELL | BUSY="0" CELL | BUSY="1" CELL | BUSY="0" CELL | BUSY="1" CELL | BUSY="0" CELL |

Fig. 10

NETWORK TERMINATION ENABLING RELIEF OF CALL CONGESTION IN AN EXCHANGER

BACKGROUND OF THE INVENTION

1. Field of the Invention

The present invention relates to a network termination enabling relief of call congestion in an exchanger provided in a digital communication network, such as an ISDN (Integrated Services Digital Network).

2. Description of the Related Art

Recently, the ISDN is widely utilized as a digital communication network to achieve high speed digital data transmission, such as telephone communication, facsimile communication, computer data communication and the like. Further, recently, a B-ISDN is developed for high speed digital communication. In the B-ISDN, it is possible to perform various digital communication, each having different transmission speed for example, CATV, telephone, GIII facsimile, and the like on the same network. A SDH (Synchronous Digital Hierarchy) method is employed in the B-ISDN, and an ATM (Asynchronous Transfer Mode) method is also employed in combination with the SDH method to achieve high speed digital data transmission. In general, a plurality of exchangers are provided in an ISDN, and a plurality of terminal adaptors are connected to each of exchangers through a network termination. The terminal adaptors are provided for users. Further, the SDH method utilizes a plurality of ATM cells to transfer the data from the exchanger to the terminal adaptors, and from the terminal adaptor to the exchanger. As explained in detail below, a SDH frame has a plurality of ATM cells, and one ATM cell is constituted by a header field and an information field.

Sometimes, the exchanger becomes congested with calls caused by an overflow of calls from the end terminal adaptor. In this case, "call" means the state where the data fills the information field of the ATM cell. Accordingly, it is necessary to limit the transfer of the data from the terminal adaptor to the exchanger to relieve the call congestion in the exchanger.

SUMMARY OF THE INVENTION

The object of the present invention is to provide a network termination enabling relief of call congestion in an exchanger provided in a digital communication network.

In accordance with the present invention, there is provided a network termination connected to an exchanger and a plurality of terminal adaptors, and enabling relief of call congestion in an exchanger, the network termination includes: a reception port for receiving a reduction rate indicated by a congestion information from the exchanger; a frame transmission unit for transferring the frame including a plurality of cells, each cell having a header field and an information field, and the header field having a busy bit field; an unusable cell preparation unit operatively connected to the frame transmission unit for generating the cell train including the unusable cells defined based on the reduction rate from the exchanger; and a transmission port operatively connected to the unusable cell preparation unit for transferring the cell train including the unusable cells to the end terminals.

In the preferred embodiment, the unusable cell preparation unit comprises a reduction rate reception unit operatively connected to the reception port for receiving the reduction rate from the exchanger, an unusable cell command unit for commanding the unusable cell based on the reduction rate, and an OR gate into which the command and the frame are input and for outputting the cell train including the unusable cell to the terminal adaptor through a bus line.

In the preferred embodiment, the unusable cell command unit comprises a sequencer for storing various reduction rates, a selector for selecting the reduction rates from the sequencer, and a counter for counting busy bits and outputting resultant count data to the sequencer.

In the preferred embodiment, the reduction rate is defined based on the amount of call congestion in the exchanger.

In the preferred embodiment, the reduction rate is 50%, and each busy bit of the cell is alternately set to bit "1" to produce the reduction rate 50%.

In the preferred embodiment, the exchanger rejects the cell having the busy bit "1" when the information area is vacant to relieve call congestion therein.

DESCRIPTION OF THE PREFERRED EMBODIMENTS

Before describing the preferred embodiments, an explanation will be given of a conventional system.

Figure 1:
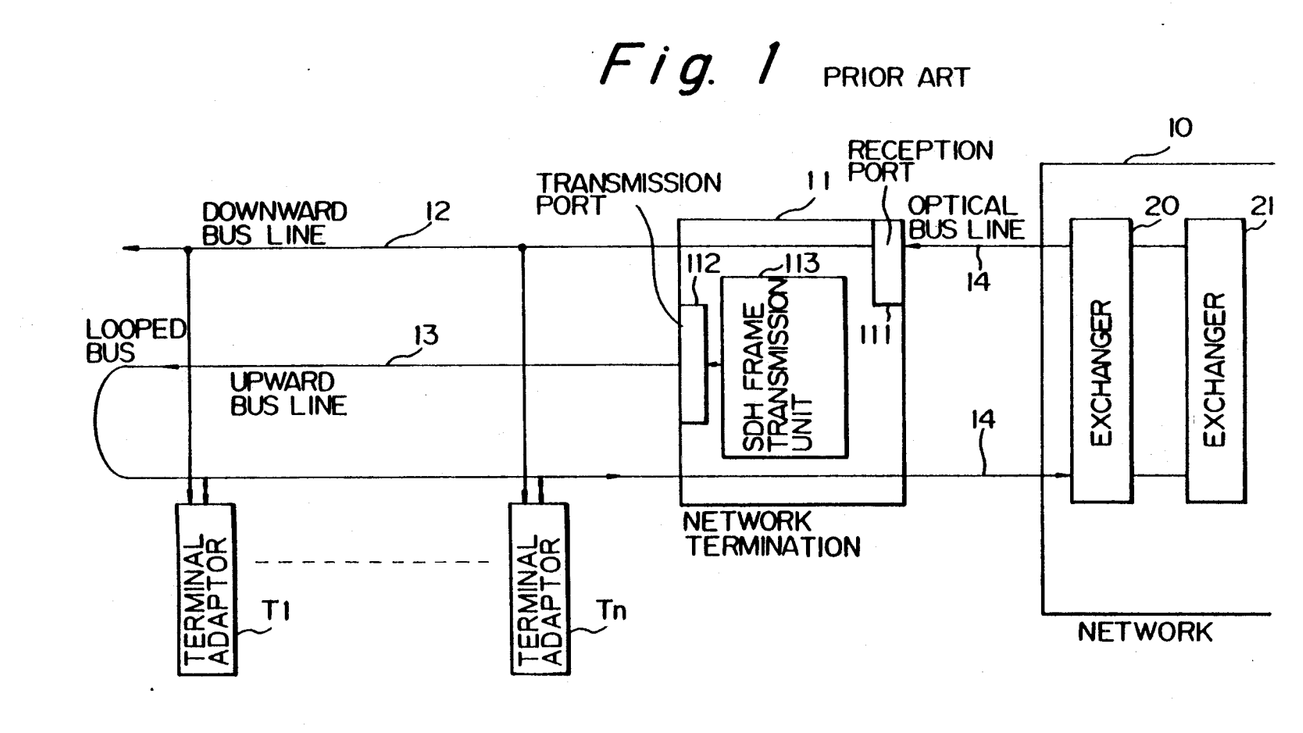
FIG. 1 is a schematic block diagram of a conventional network termination.

FIG. 1 is a schematic block diagram of a conventional network termination provided for an exchanger. In FIG. 1, reference number 10 denotes a digital communication network, such as a B-ISDN, 11 a network termination, 12 a downward bus line, 13 an upward bus line, 14 a bidirectional optical fiber line, and 20 and 21 exchangers. T1 to Tn denote terminal adaptors for users. The network termination 11 comprises a reception port 111, transmission port 112, and a SDH frame transmission unit 113. In this network, the downward and upward bus lines 12 and 13 are wired, for example, in a building. The bidirectional optical line is wired into the ISDN network.

In the network termination 11, the reception port 111 is connected to the exchanger 20, and connected to the terminal adaptors T1 to Tn through the downward bus line 12. The transmission port 112 is connected to the terminal adaptors T1 to Tn through the upward bus line 13. The upward bus line 13 is called a "looped bus".

Accordingly, the SDH frame transmission unit 113 is connected to the terminal adaptors T1 to Tn through the transmission unit 112 and the upward bus line 13.

The data to be stored in the terminal adaptors T1 to Tn is transferred from the exchanger 20 to the reception port 111 of the network termination 11 and further transferred to the terminal adaptors T1 to Tn through the downward bus line 12. In this case, the data is transferred with an ATM cell. A plurality of the ATM cells are contained in the payload of the SDH frame as explained in detail below. Further, when the data is transferred from the terminal adaptors T1 to Tn to the exchanger 20, the data is transferred with the ATM cells included in the SDH frame. In an ATM communication, various data can be asynchronously transferred from the exchanger to the terminal adaptor, and from the terminal adaptor to the exchanger by using the ATM cells included in the SDH frame.

Figure 2:
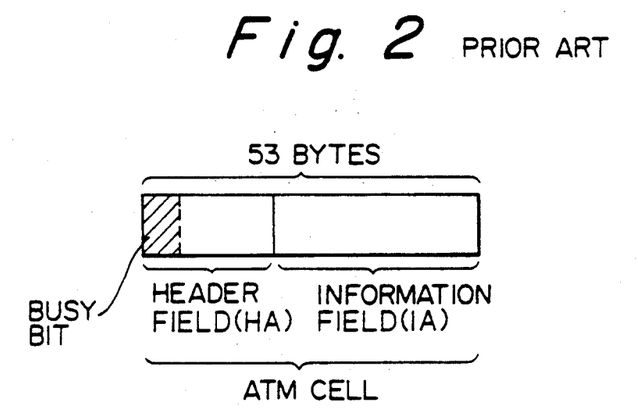
FIG. 2 is a view for explaining an ATM cell.
Figure 3:
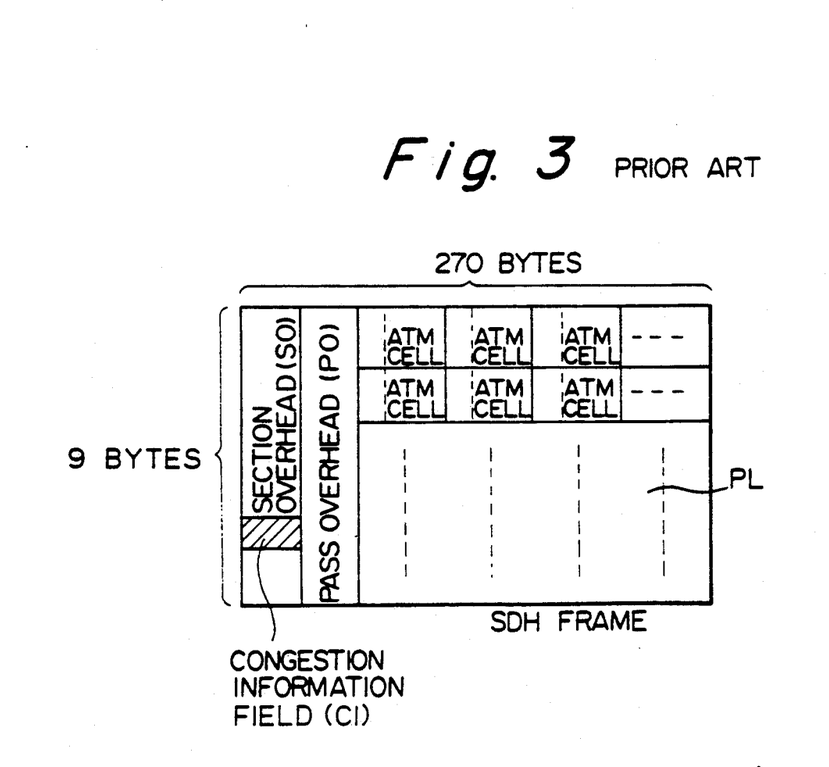
FIG. 3 is a view for explaining a SDH frame.

FIG. 2 is a view of for explaining the ATM cell, and FIG. 3 is a view for explaining the SDH frame.

As shown in FIG. 2, one ATM cell is constituted by a header field HA and an information field IA. The header field has a busy bit field indicating that the information field IA is vacant or full. In this case, the remaining portion of the header field HA stores various control data, for example, destination data indicating the terminal adaptor, and parity check data, etc. The information field IA stores the information to be transferred to the terminal adaptor. In general, the length of one ATM cell is defined as 53 bytes including 5 bytes of the header field HA, in the international standard.

As shown in FIG. 3, the SDH frame is constituted by a payload field PL, a pass overhead field PO, a section overhead area SO and a call congestion information field CI. The size of one frame is defined as, for example, 90 bytes×9 or 270 bytes×9 in the international standard. The payload area PL is divided into a plurality of the ATM cells. As explained above, the SDH frame is used for transferring the ATM cell from the exchanger to the terminal adaptor and from the terminal adaptor to the exchanger. When transferring from the terminal adaptor to the exchanger, initially, all busy fields of the ATM cells of the SDH frame in the SDH frame transmission unit 113 are set to bit "0" to store the data in the terminal adaptor.

When the busy bit field of the header field HA is set to the bit "0", this busy bit "0" indicates that the information field is vacant and the data can be stored in the information field. Accordingly, when the terminal adaptor detects the busy bit "0", that terminal adaptor stores its own data in the information field of the ATM cell, and changes the busy bit "0" to the bit "1" after the data is stored. When the busy bit is "1", other terminal adaptors cannot use that ATM cell. In the case of data transmission from the terminal adaptor to the exchanger, the SDH frame containing the ATM cells is transmitted to the exchanger 20 through the upward bus line 13. The exchanger 20 detects the busy field of the header, and rejects the ATM cell when its busy bit is "0". The exchanger 20 handles only the ATM cell of which the busy bit is "1".

Figure 4:
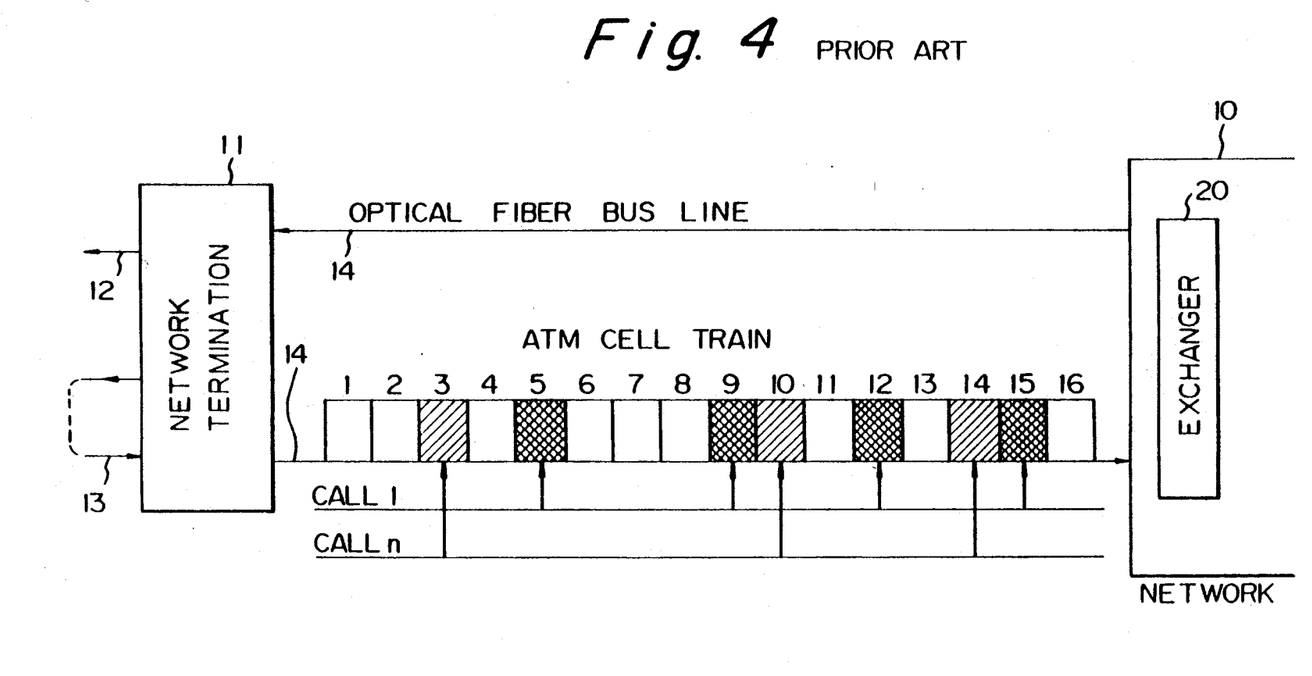
FIG. 4 is a view for explaining an ATM cell train on an optical fiber bus line 14.

FIG. 4 is a view for explaining the ATM cell train on the optical fiber bus line 14. As shown in the drawing, for example, ATM cells 5, 9, 12, and 15 are used for the call "1", and ATM cells 3, 10, and 14 are used for the call "n". As is obvious from the timing chart, the calls are asynchronously transferred to the exchanger 20 by use of the ATM cell of which the busy bit is "0" in the ATM method. As explained above, in this case, each ATM cell is constituted by the head field HA and the information field IA.

An explanation is given below of a conventional countermeasure against call congestion in an exchanger.

When calls are concentrated in the exchanger 20 so that it becomes congested with calls, it writes a predetermined reduction rate, for example, 50%, into the congestion information field CI of the SDH frame and transfers the reduction rate to the terminal adaptor. In this case, reduction rate 50% means that a half of all ATM cells are set to "unusable cell". In the conventional art, each end terminal T1 to Tn has a transmission limitation software which limits the transmission of its own data to the exchanger. Accordingly, when the terminal adaptor receives the reduction rate from the exchanger 20 through the network termination 11 and the downward bus line 12, the terminal adaptor limits the transmission of data in the following manner based on the transmission limitation software. That is, when two busy bits "0" are sequentially transferred through the downward bus line 12, the terminal adaptor picks up only one of two busy bits "0" and utilizes them to store the data in the information field IA of that ATM cell. Then, the busy bit "0" is changed to a busy bit "1" after the data is stored in the information field IA. Accordingly, the exchanger rejects the busy bit "0" so that it is possible to relieve call congestion in the exchanger 20 based on the predetermined reduction rate.

In above conventional art, however, it is necessary to provide the transmission limitation software for every terminal adaptor. To provide the transmission limitation software for every terminal adaptor results in a considerable increase in cost of the system.

Figure 5:
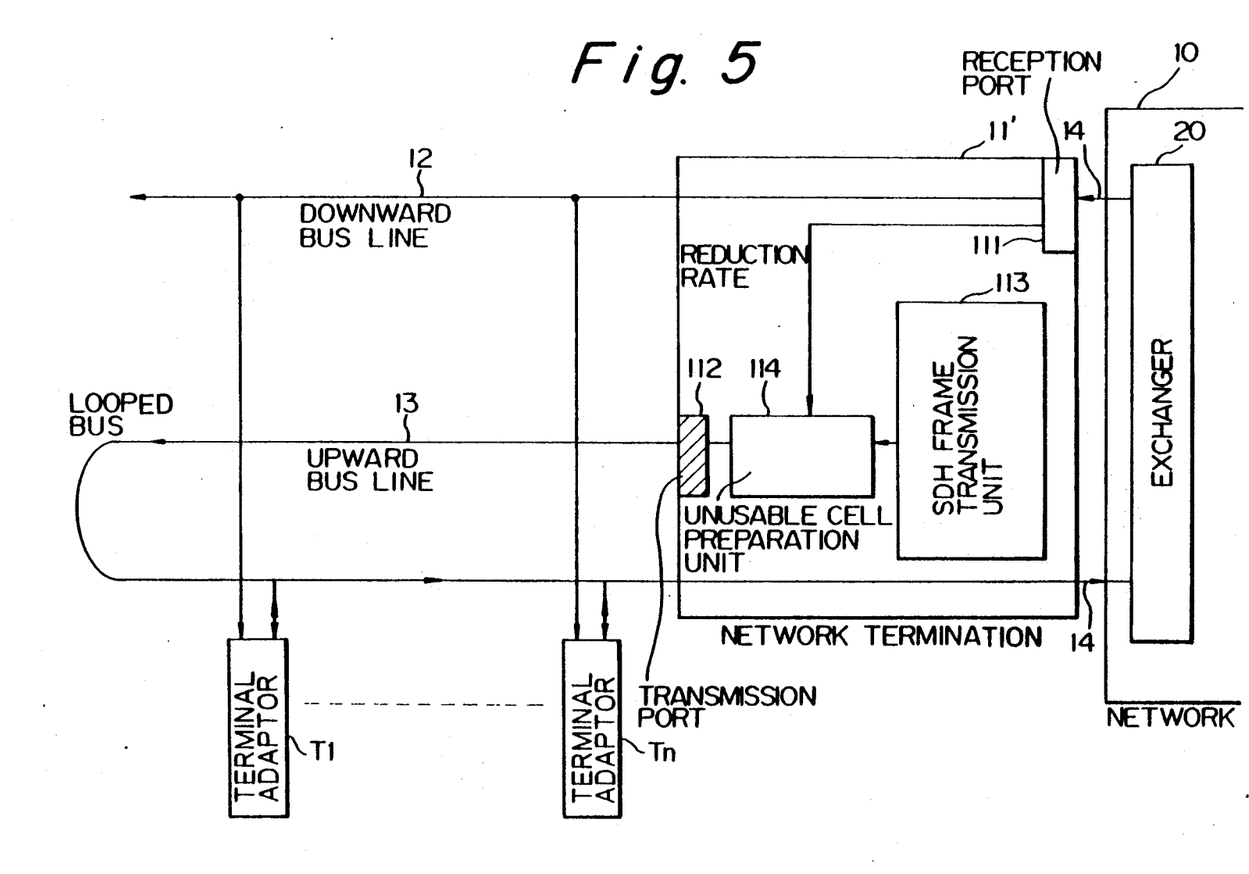
FIG. 5 is a schematic block diagram of a network termination enabling relief of call congestion in an exchanger according to the present invention.

FIG. 5 is a schematic block diagram of a network termination enabling relief of call congestion in an exchanger according to the present invention. In FIG. 5, reference number 11' denotes a new network termination according to the present invention. Reference number 114 denotes an unusable cell preparation unit according to the present invention. The unusable cell preparation unit 114 is connected between the SDH frame transmission unit 113 and the transmission unit 112. The unusable cell preparation unit 114 has a function of changing the ATM cells input from the SDH frame transmission unit 113 to unusable cells based on the reduction rate defined by the exchanger 20 in accordance with the call congestion state. The reduction rate is commanded from the exchanger 20 to the unusable cell preparation unit 114 through the reception unit 111. As explained above, the predetermined reduction rate is transferred into the congestion information field CI in the SDH frame from the exchanger 20.

The unusable cell preparation unit 114 is constructed by using simple hardware as explained in detail below. Accordingly, in the present invention, since it is not necessary to provide the transmission limitation software for every terminal adaptor, it is possible to considerably reduce the cost of the system.

Figure 6:
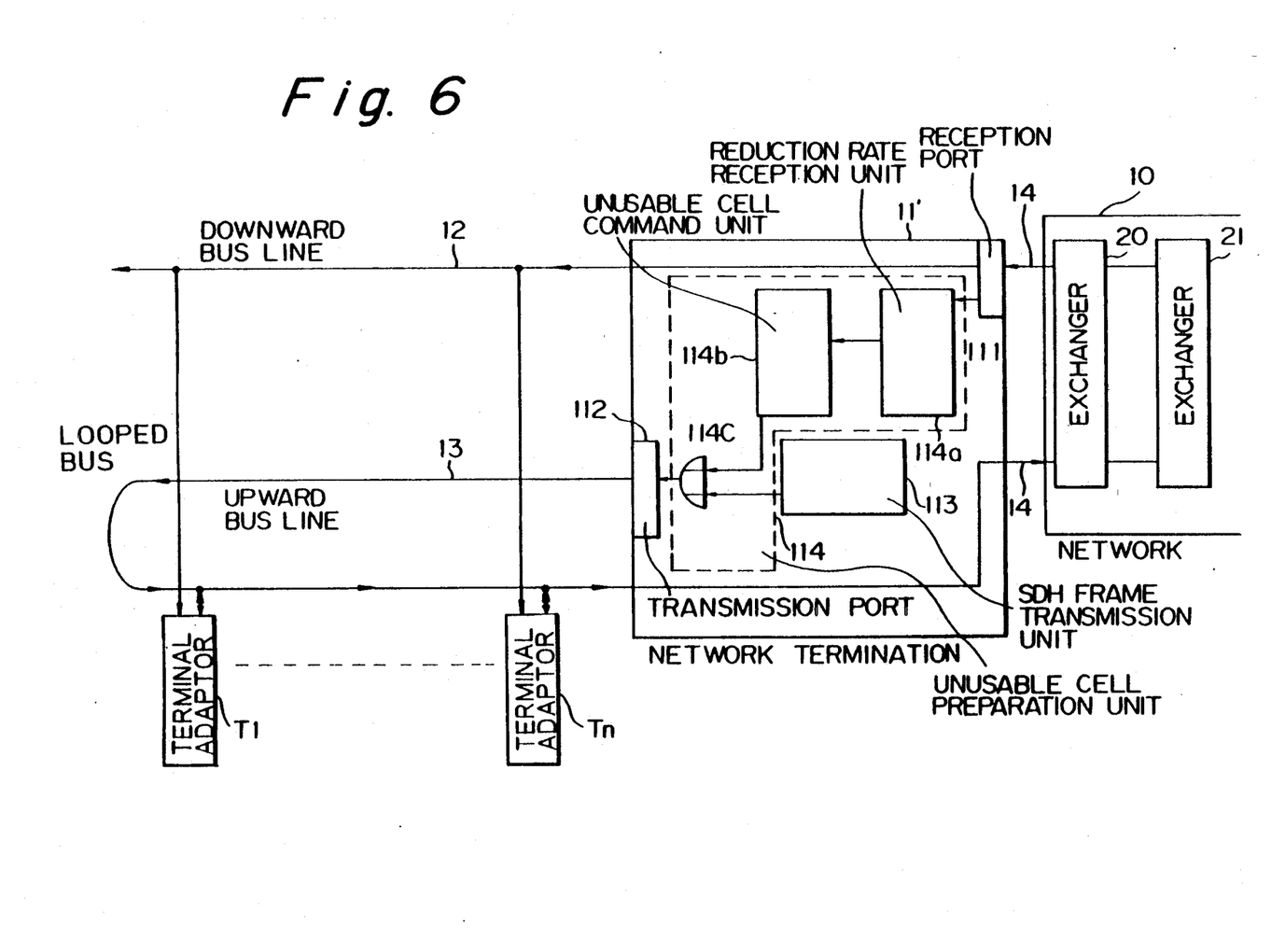
FIG. 6 is a detailed block diagram of unusable cell preparation unit shown in FIG. 5.
Figure 7:
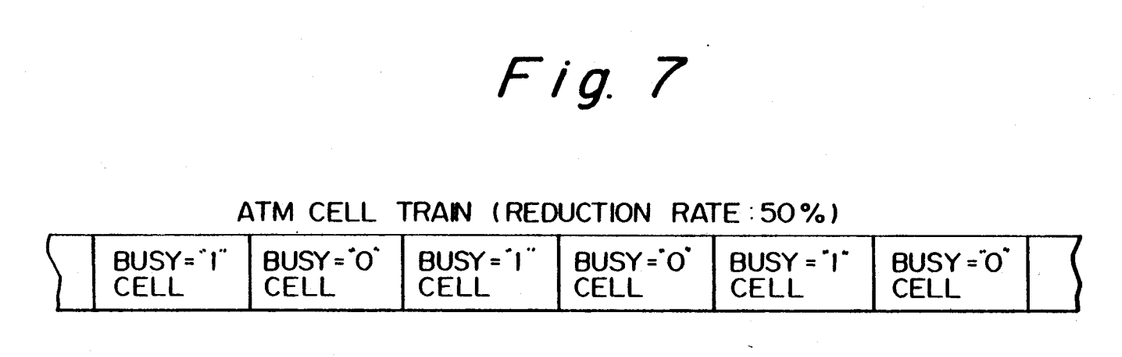
FIG. 7 is a view for explaining the reduction rate of the ATM cell according to the present invention.

FIG. 6 is a detailed block diagram of an unusable cell preparation unit shown in FIG. 5. FIG. 7 is a view for explaining the reduction rate of the ATM cell according to the present invention. The unusable cell preparation unit 114 comprises a reduction rate reception unit 114a for receiving the reduction rate from the exchanger, an unusable cell command unit 114b for generating the command of the reduction rate, and OR gate 114c. The unusable cell command unit 114b transfers the command of the reduction rate, for example, of 50% to the OR gate 114c. Further, the ATM cells of the SDH frame and having the bit "0" of the busy area are input to the OR gate 114c. Accordingly, the output of the OR gate indicates the ATM cell train having the predetermined reduction rate. In this case, the predetermined reduction is performed in such a manner that the busy bit of the header field HA of the ATM cell is alternately changed to the bit "1" as shown in FIG. 7. The ATM cell train output from the OR gate 114c is transferred to the terminal adaptor T1 to Tn through the transmission port 112 and the upward bus line 13.

When the terminal adaptor detects the busy bit "1" of the header field HA of the ATM cell, the terminal adaptor does not store the data in the information field IA of that ATM cell. Further, the terminal adaptor stores the data in the information field IA only when the busy bit is "0", and the busy bit "0" is changed to bit "1" after the data is stored in the information field IA. Accordingly, in the present invention, all headers from the network termination 11' are set to the busy bit "1", but either the information field IA is filled by the data, or the information field IA is vacant. Further, the exchanger 20 rejects the ATM cell which the information field is vacant, even if the busy bit is "1", so that it is possible to considerably relieve the call congestion in therein.

Figure 8:
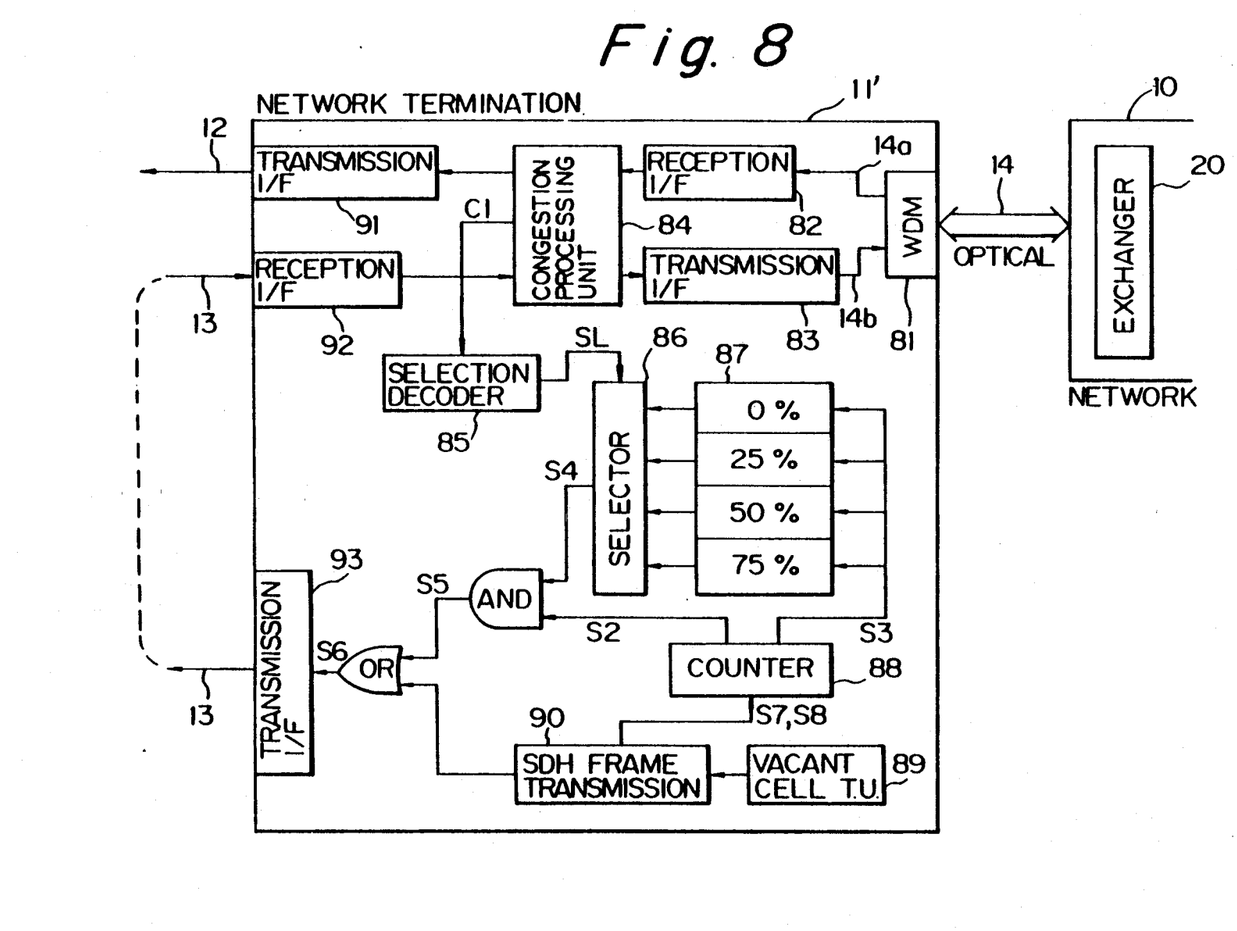
FIG. 8 is a detailed block diagram of the network termination shown in FIG. 6.
Figure 9:
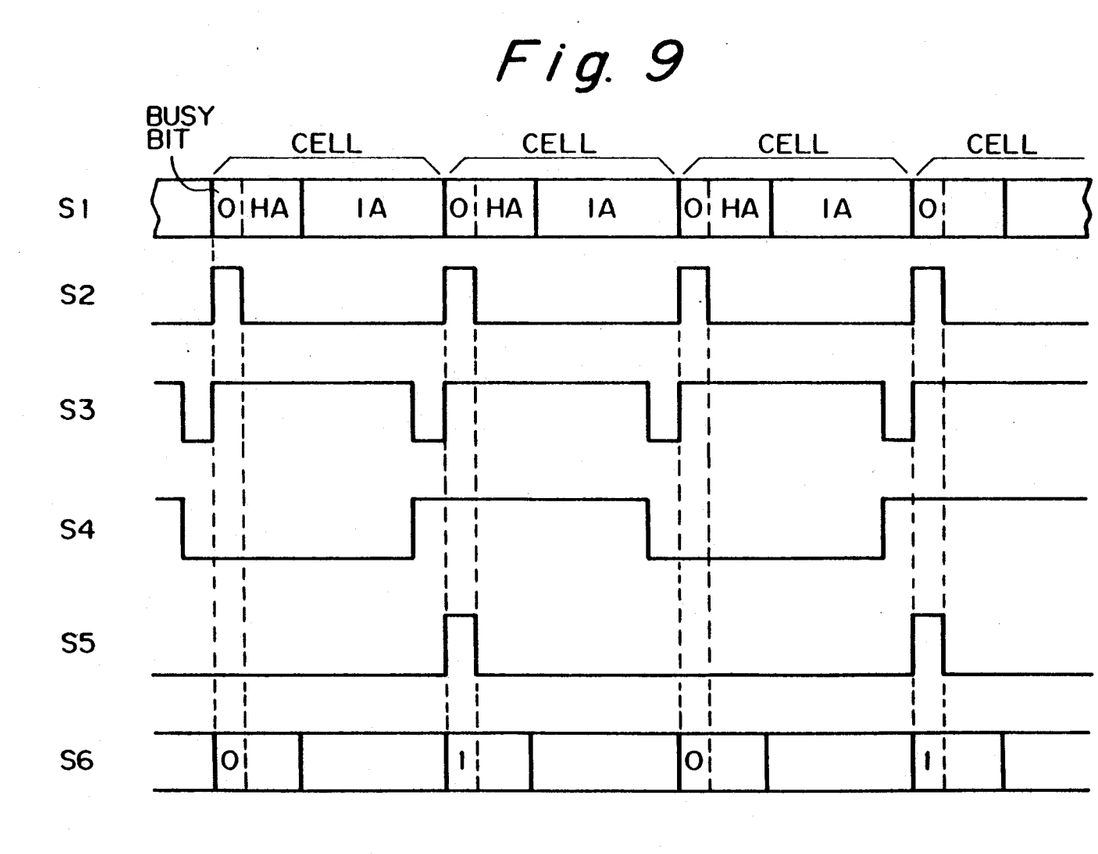
FIG. 9 is a signal timing chart of each point in the network termination shown in FIG. 8.

FIG. 8 is a detailed block diagram of the network termination 11' shown in FIG. 6, and FIG. 9 is a signal timing chart of each point in the network termination shown in FIG. 8. In FIG. 8, reference 14 denotes the bidirectional optical fiber bus line connected between the exchanger 20 and the network termination 11', 81 a wavelength division multiplexer (WDM) for connecting between the bidirectional optical bus line 14 and the one way optical bus lines 14a and 14b. As explained above, these optical bus lines 14, 14a and 14b are used as subscriber lines. The wavelength division multiplexer 81 switches the direction of the transmission based on the wavelength of the light.

Reference number 82 denotes a reception interface for a subscriber line, 83 a transmission interface for a subscriber line, 84 a call congestion processing unit, 85 a selection signal decoder, 86 a selector, 87 a sequencer, 88 a counter, 89 a vacant cell transmission unit, 90 a SDH frame transmission unit, 91 a transmission interface for a customer bus line, 92 a reception interface for a customer bus line, and 93 an upstream transmission interface for a customer bus line.

The call congestion processing unit 84 receives the SDH frame from the exchanger 20 through the wavelength division multiplexer 81 and the reception interface 82, and generates the congestion information CI (see, FIG. 3) which indicates the reduction rate of the ATM cell. The selection signal decoder 85 decodes the reduction rate and generates a selection signal SL to the selector 86 based on the reduction rate. The selector 86 generates a transmission busy signal S4 to the AND gate.

The sequencer 87 stores various reduction rates, for example, 0%, 25%, 50%, and 75%. In the sequencer 87, each reduction rate is stored in the form of the binary bit, for example, 0% corresponds to bit "00", 25% to bit "01", 50% to bit "10", and 75% to bit "11", respectively. The selector 86 selects one of the reduction rates, for example, a reduction rate of 50% based on the selection signal SL, and the selected reduction rate is output to the AND gate.

The counter 88 counts the busy bit and generates a busy bit timing signal S2 to the AND gate and also generates a cell frame pulse S3 to the sequencer 87. The vacant cell transmission unit 89 generates a command which changes all busy bits to the bit "0" to the SDH frame transmission unit 90 so that the SDH frame transmission unit 90 generates a vacant cell signal SI to the OR gate. The OR gate generates the ATM cell train S6 including the reduction rate as shown in FIG. 7.

Each signal is explained in detail in the timing chart shown in FIG. 9. The signal S1 is output from the SDH frame transmission unit 90 to the OR gate and denotes the ATM cell train, and each busy bit of the header field HA is set to the bit "0" by the vacant cell transmission unit 89. The signal S2 is output from the counter 88 to the AND gate and denotes the busy bit timing. The signal S3 is output from the counter 88 to the sequencer 87 and denotes the cell frame pulse provided in front of each ATM cell. The signal S4 is output from the selector 86 to the AND gate and denotes the transmission busy bit. The signal S5 is output from the AND gate to the OR gate and denotes the congestion signal which is obtained by AND operation between the signal S2 and the signal S4. The signal S6 is output from the OR gate to the terminal adaptor through the transmission interface 93 and the upward bus line 13. Further, the SDH frame signal transmission unit 90 generates a payload enable signal S7 and a frame pulse S8 to the counter 88.

Figure 10:
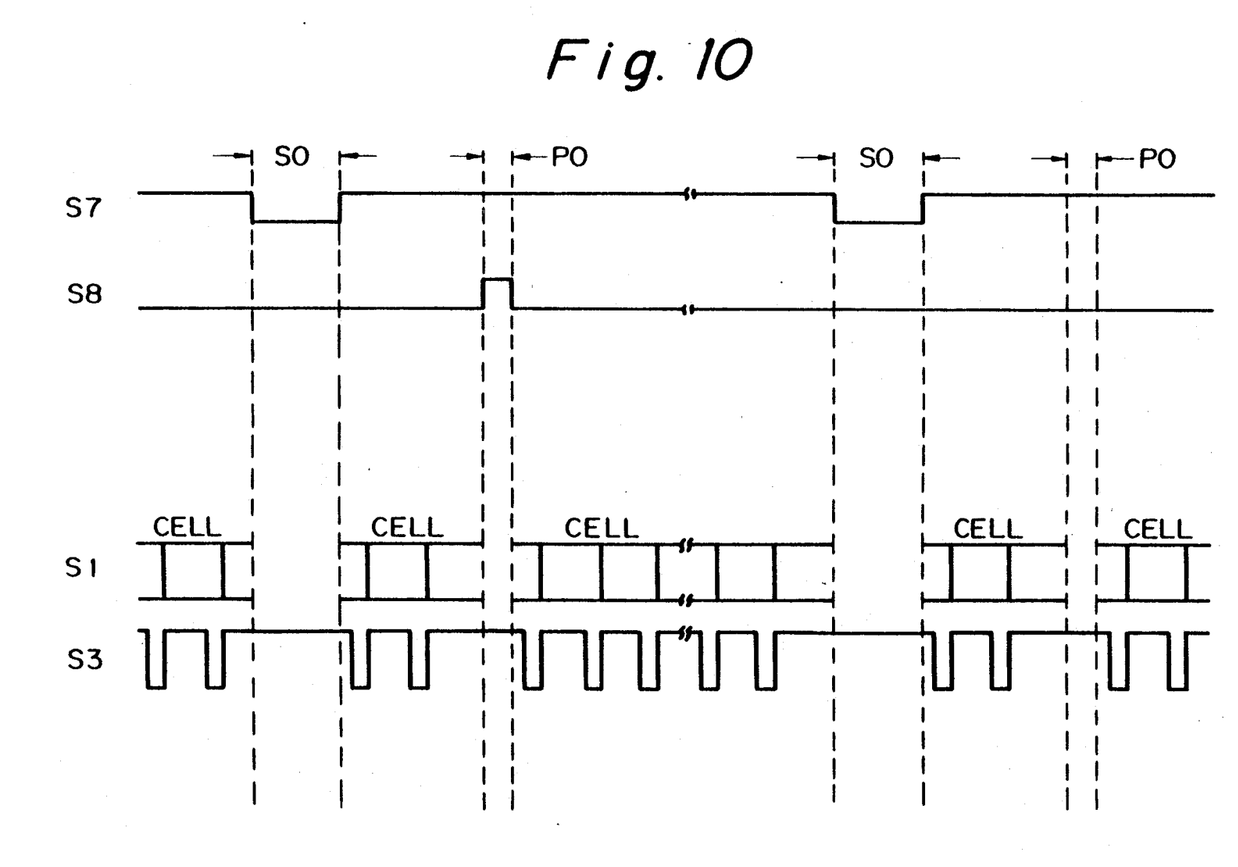
FIG. 10 is a signal timing chart of a payload enable signal and a SDH frame pulse.

FIG. 10 is a signal timing chart of signals S7 and S8. In FIG. 10, the signals S1 and S3 are the same signals as shown in FIG. 9. Further, S0 denotes the section overhead, and P0 denotes the pass overhead in FIG. 3. The payload enable signal S7 indicates the head of the data in the SDH frame, and the frame pulse signal S8 indicates the head of the SDH frame. As is obvious from the timing chart, the signal S7 starts the section overhead and the signal S8 starts the pass overhead so that the ATM cell train S1 and the ATM cell frame pulse S3 are interrupted during the section overhead S0 and the pass overhead P0.

We claim:
1. A network termination connected to an exchanger and a plurality of terminal adaptors, and enabling relief of call congestion in an exchanger, the network termination comprising:
reception means for receiving a reduction rate included in congestion information transmitted from the exchanger;
frame transmission means for transferring a frame including a plurality of cells, each cell having a header field and an information field, and the header field having a busy bit field;
unusable cell preparation means operatively connected to said frame transmission means and for generating a train having a plurality of cells including the unusable cells defined based on the reduction rate from said reception means; and
transmission means operatively connected to said unusable cell preparation means and for transferring the cell train including the unusable cells to the terminal adaptors.

2. A network termination as claimed in claim 1, wherein said unusable cell preparation means comprises:
a reduction rate reception unit operatively connected to said reception means for receiving the reduction rate from the exchanger;

an unusable cell command unit for commanding the unusable cell based on the reduction rate; and an OR gate for inputting the command and the frame and outputting the cell train including the unusable cell to the terminal adaptors through a bus line.

3. A network termination as claimed in claim 2, wherein said unusable cell command unit comprises:

a sequencer for storing various reduction rates;

a selector for selecting the reduction rates from said sequencer; and a counter for counting busy bits and outputting resultant count data to said sequencer.

4. A network termination as claimed in claim 1, wherein said reduction rate is defined based on call congestion in the exchanger.

5. A network termination as claimed in claim 4, wherein said reduction rate is 50%, and each busy bit of the cell is alternately set to bit "1" to produce the reduction rate of 50%.

6. A network termination as claimed in claim 1 wherein said exchanger rejects the cell having the busy bit "1" when the information area is vacant to relieve call congestion therein.

7. A network termination as claimed in claim 5, wherein said exchanger rejects the cell having the busy bit "1" when the information area is vacant to relieve call congestion therein.

* * * * *

UNITED STATES PATENT AND TRADEMARK OFFICE
CERTIFICATE OF CORRECTION

PATENT NO. : 5,231,630
DATED : JULY 27, 1993
INVENTOR(S) : RYOICHI ISHIBASHI ET AL.

It is certified that error appears in the above-indentified patent and that said Letters Patent is hereby corrected as shown below:

Title PAGE [56] References Cited:

"5,067,127   11/1991   Ochiai ........370/95.1"

should be

--4,922,244   5/1990   Hullett et al.........340/825.5
  5,050,166   9/1991   Cantoni et al.........370/94.1
  5,051,742   9/1991   Hullett et al.........340/825.5
  5,067,127  11/1991   Ochiai................370/95.1--.

Title PAGE, Col. 2, after line 4, insert

--PATENT ABSTRACTS OF JAPAN, Vol. 014, No. 038 (E-878) 24 January 1990 & JP-A-1 272 245 (FUJITSU) 31 October 1989.

PATENT ABSTRACTS OF JAPAN, Vol. 015, No. 121 (E-1049) 25 March 1991 & JP-A-3 010 543 (FUJITSU) 18 January 1991.

INT. SYMPOSIUM ON SUBSCRIBER LOOPS AND SERVICES 88, September 1988, Boston, Mass., "A Flexible Customer Premises Network Concept Based on ATM Principles", B. Pauwels, pps. 246-250.--.

UNITED STATES PATENT AND TRADEMARK OFFICE
CERTIFICATE OF CORRECTION

Page 2 of 2

PATENT NO. : 5,231,630
DATED : JULY 27, 1993
INVENTOR(S) : RYOICHI ISHIBASHI ET AL.

It is certified that error appears in the above-indentified patent and that said Letters Patent is hereby corrected as shown below:

Col. 6, line 49, "exchanger;" should be --exchanger and for outputting the reduction rate;--;
line 54, "means" should be --means,--;
line 55, "and" should be --,--.

Signed and Sealed this

Seventeenth Day of May, 1994

Attest:

BRUCE LEHMAN

*Attesting Officer*     *Commissioner of Patents and Trademarks*